No. 662,175. Patented Nov. 20, 1900.
J. L. STARKS.
OVEN.
(Application filed Feb. 6, 1900.)
(No Model.)
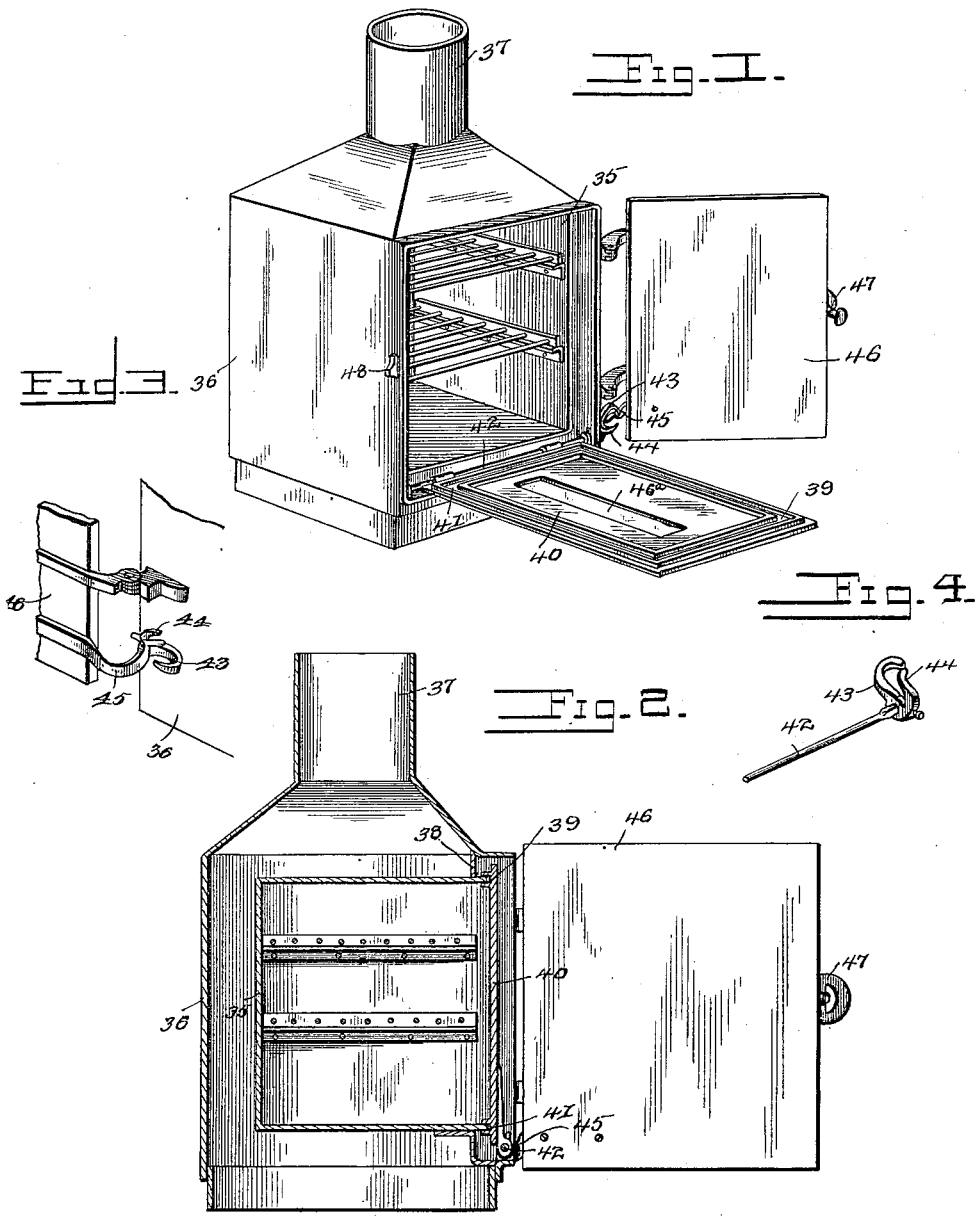
Witnesses
F. E. Alden
H. J. Riley
J. L. Starks Inventor
By his Attorneys,
C. A. Snow & Co.
THE NORRIS PETERS CO., PHOTO-LITHO., WASHINGTON, D. C.

UNITED STATES PATENT OFFICE.

JOHN LITTLEBERRY STARKS, OF WEST NASHVILLE, TENNESSEE.

OVEN.

SPECIFICATION forming part of Letters Patent No. 662,175, dated November 20, 1900.

Application filed February 6, 1900. Serial No. 4,200. (No model.)

*To all whom it may concern:*

Be it known that I, JOHN LITTLEBERRY STARKS, a citizen of the United States, residing at West Nashville, in the county of Davidson and State of Tennessee, have invented a new and useful Oven, of which the following is a specification.

The invention relates to improvements in ovens.

One object of the present invention is to provide an oven adapted to be opened to permit its contents to be inspected without allowing the hot air and aroma surrounding the contents to escape, and another object of the invention is to enable access to the interior of the oven to be readily obtained and to provide a simple and efficient means for automatically opening and closing the inner door when the outer door is opened and closed beyond certain limits.

The invention consists in the construction and novel combination and arrangement of parts hereinafter fully described, illustrated in the accompanying drawings, and pointed out in the claims hereto appended.

In the drawings, Figure 1 is a perspective view of the oven, the inner and outer doors being open. Fig. 2 is a vertical sectional view of the same, the outer door being partly open and the inner door being closed. Fig. 3 is a detail perspective view illustrating the construction for automatically operating the inner door of the oven and showing the arrangement of the parts when the outer door is partly open and arranged as illustrated in Fig. 2. Fig. 4 is a detail perspective view of one end of the rock-shaft, upon which the inner door of the oven is mounted.

Like numerals of reference designate corresponding parts in all the figures of the drawings.

The oven is composed of inner and outer shells or casings 35 and 36, the inner shell or casing being connected at its top and bottom with the front of the outer shell or casing, as clearly illustrated in Fig. 2 of the accompanying drawings, and the said inner shell or casing is spaced from the outer shell or casing at the sides, back, and top, so that the products of combustion pass around the oven and impinge against the bottom, sides, back, and top of the inner shell or casing, which receives the contents of the oven, whereby a maximum heating and cooking effect is obtained from a given quantity of fuel. The top of the outer shell or casing is tapered or pyramidal, as shown, and it is provided with a tubular extension or collar 37, adapted to receive an ordinary stovepipe or flue for conveying the smoke and other products of combustion to a chimney. The front or outer edges of the inner shell or casing are located in rear of the front edges of the outer shell or casing, and they project outward beyond the connecting flange or portion 38, which unites the inner and outer shells. The projecting edges of the inner shell are adapted to extend into a groove 39 of an inner door 40, which closes the inner shell or casing, and the groove, which may be formed by ribs or flanges, is preferably provided with a packing 41, of asbestos or other suitable material, to form a tight joint for preventing the escape of hot air and the aroma of the contents of the oven. The inner door is mounted on a horizontal rock-shaft 42, journaled in suitable bearings of the outer casing at the bottom thereof and extending through one of the side walls of the same and carrying exterior arms 43 and 44. The arms 43 and 44, which are arranged at an angle to each other, are curved and receive between them an arm 45 of an outer door 46, which is hinged to and adapted to close the outer casing. The upper arm 44 of the rock-shaft is curved longitudinally and laterally, and when the inner door is in a vertical position the lower arm 43 is in substantially a horizontal position and is curved outward, its curved outer portion being engaged by the arm of the outer door, while the latter swings through one-quarter of a revolution, whereby the inner door will be held firmly closed until the outer door has swung through such a distance. When the outer door is swung beyond a quarter of a revolution or beyond the position illustrated in Fig. 2 of the drawings, its arm 45 is carried forward from the curved end portion of the arm 43 and is caused to engage the inner edge of the upper arm 44, whereby such upper arm is swung outward, thereby rotating the rock-shaft and swinging the inner door downward to open the inner shell or casing. When the outer door is swung toward the front of the oven, the arm 45 engages the arm 43 and closes the inner door. This brings the outer door in a plane parallel with that of the rear side of the oven, and the arm 45 is curved between its engaging portion and the outer door to enable the outer portion of the arm 43 to clear it when the inner door is swung downward. The inner door is provided with a transparent panel or portion 46ª, which may be of any desired area and of any desired construction, and it is adapted to permit the contents of the oven to be inspected without opening the inner door and permitting the hot air, steam, and aroma to escape from the inner casing. By this construction the inner casing or oven proper need not be opened until its contents have been completely cooked or baked. The arms 43 and 44 are preferably formed integral with each other and are detachably secured by a clamping-screw to a squared portion of the pintle. The outer door, which is preferably hinged at its rear edge, is provided at its front edge with a locking device 47, consisting of a cam mounted on a spindle and adapted to engage a stop 48, similar to the locking devices heretofore described.

It will be apparent that the oven is simple and comparatively inexpensive in construction and that its contents may be inspected without permitting any of the hot air, steam, and aroma contained within it to escape before the operation of cooking is entirely completed.

Changes in the form, proportion, size, and the minor details of construction within the scope of the appended claims may be resorted to without departing from the spirit or sacrificing any of the advantages of this invention.

What I claim is—

1. An oven comprising inner and outer casings, an inner door closing the inner casing, an outer door closing the outer casing, and means for connecting the doors, whereby the inner door will be held in its closed position during a portion of the opening movement of the outer door, whereby the latter may be opened and closed without opening the inner door, substantially as and for the purpose described.

2. An oven comprising inner and outer casings, an inner door closing the inner casing, an outer door closing the outer casing, and means for connecting the inner and outer doors, whereby the inner door will be held closed during the first portion of the opening movement of the outer door and will be opened by a continued movement of the outer door and closed by the movement of the outer door in the reverse direction, substantially as described.

3. An oven composed of inner and outer casings, an inner door for closing the inner casing provided with a transparent panel to permit the contents of the inner casing to be inspected without opening it, an outer door for closing the outer casing, and means for connecting the doors, whereby the inner door will be held in its closed position during the first portion of the opening movement of the outer door, substantially as and for the purpose described.

4. An oven comprising inner and outer casings, a rock-shaft mounted on the outer casing and extending through the same, an inner door carried by the rock-shaft and arranged to close the inner casing, arms mounted on the exterior portion of the rock-shaft, and an outer door engaging the said arms, whereby the inner door is opened and closed by the movement of the outer door and is held in its closed position during the first portion of the opening movement of the said outer door, substantially as described.

5. An oven comprising inner and outer casings, a rock-shaft journaled in suitable bearings of the oven and having one end extended through the same, an inner door mounted on and carried by the rock-shaft and arranged to close the inner casing, arms mounted on the extended end of the rock-shaft, one of the arms being provided with an extension disposed horizontally when the inner door is closed, and an outer door provided with an arm arranged to engage the said arms, and adapted to ride on the extension whereby the inner door is held in its closed position during the first portion of the opening movement of the outer door, substantially as and for the purpose described.

6. An oven, a rock-shaft journaled in suitable bearings of the oven and extended through the same, an inner door mounted on the rock-shaft, the upper and lower arms mounted on the extended portion of the rock-shaft, the lower arm being provided with a curved extension, and an outer door provided with an arm arranged between the said arms and adapted to engage the extension of the lower arm, whereby the inner door will be held closed during the first portion of the opening movement of the outer door, substantially as described.

In testimony that I claim the foregoing as my own I have hereto affixed my signature in the presence of two witnesses.

JOHN LITTLEBERRY STARKS.

Witnesses:
W. J. ARRINGTON,
NICK MALONE.